United States Patent [19]
Luhman et al.

[11] 3,938,298
[45] Feb. 17, 1976

[54] SYSTEM FOR INFLATION AND SEALING OF AIR CUSHIONS

[75] Inventors: Robert A. Luhman, Township of Cylon, County of St. Croix, Wis.; John R. Ward, St. Paul, Minn.

[73] Assignee: Minnesota Mining and Manufacturing Company, St. Paul, Minn.

[22] Filed: May 20, 1974

[21] Appl. No.: 471,689

[52] U.S. Cl. .......................... 53/7; 53/22 A; 53/79; 53/112 A; 156/147
[51] Int. Cl.² ...................................... B65B 31/04
[58] Field of Search ............ 53/22 R, 22 A, 22 B, 7, 53/79, 112 R, 112 A, 112 B; 156/145, 147

[56] References Cited
UNITED STATES PATENTS

| | | | |
|---|---|---|---|
| 3,303,628 | 2/1967 | Lovas et al. | 53/112 A X |
| 3,540,186 | 11/1970 | Parvin et al. | 53/112 R X |

*Primary Examiner*—Travis S. McGehee
*Attorney, Agent, or Firm*—Alexander, Sell, Steldt & DeLaHunt

[57] ABSTRACT

A system providing an improved inflatable cushion of the type comprising two films of a thermoplastic fused together to provide a plurality of inflatable chambers between the films, with each chamber communicating with a central inlet opening through an inlet passageway; and an improved device for filling and sealing such a cushion. The inlet opening for the cushion extends through only one of the films, and the device has a nozzle which directs air into the opening against the portion of the other film which extends across the opening, so that the air will be evenly deflected through the inlet passageways to simultaneously inflate all the chambers in the cushion.

11 Claims, 9 Drawing Figures

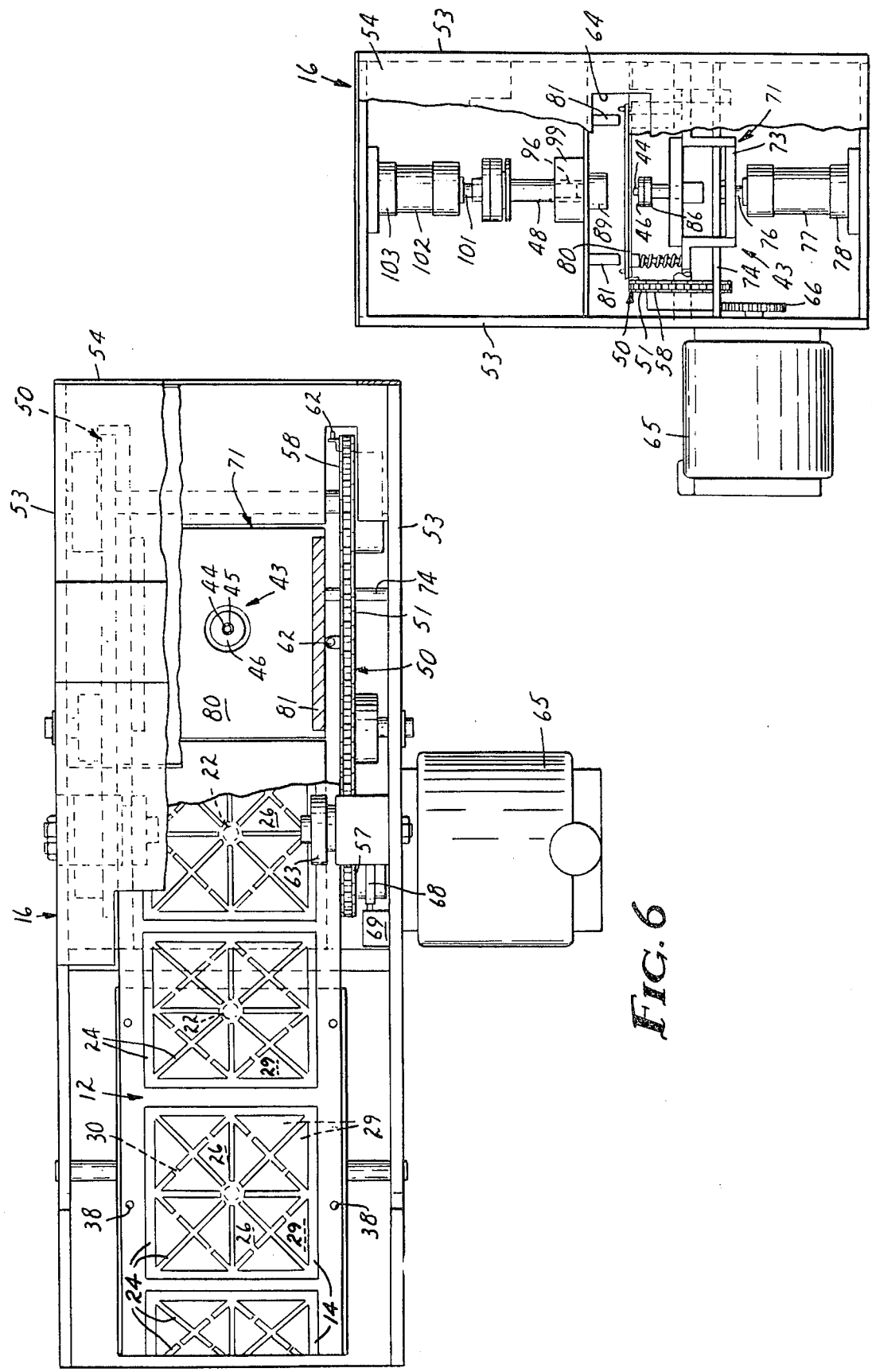

3,938,298

SYSTEM FOR INFLATION AND SEALING OF AIR CUSHIONS

BACKGROUND OF THE INVENTION

1. Field of the Invention

The present invention relates to air cushions of the type comprising chambers filled with air between two films of thermoplastic material, and to devices for filling and sealing such air cushions.

2. Description of the Prior Art

Copending U.S. patent application Ser. No. 471,580, filed May 20, 1974 (the disclosure whereof is incorporated by reference herein) teaches and claims a novel inflatable cushion configuration and a simple and versatile system which affords inflating and sealing previously prepared inflatable air cushions of the new configuration at the site of their intended use. The novel cushions claimed in U.S. patent application Ser. No. 471,580, comprise two thin flexible films each having at least one surface formed by a heat sealable thermoplastic material. The films are positioned with their thermoplastic surfaces in face to face contact, and are fused together in discrete areas to provide a plurality of inflatable chambers between the films disposed around an opening in at least one of the films, with each chamber having a separate inlet passageway communicating with the opening. The system claimed includes this novel cushion and a device comprising nozzle means for directing air into the opening and inlet passageways to simultaneously inflate all the chambers, and a means for sealing shut the inlet passageways around the opening to seal an inflated cushion.

SUMMARY OF THE INVENTION

This application claims an improvement on the invention claimed in U.S. patent application Ser. No. 471,580 which improvement is disclosed but not claimed in that application.

A system according to the present invention includes an inflatable cushion having the aforementioned structure in which the opening extends through only one of the films, with a portion of the other film extending across the opening; and the use of a nozzle means which directs air through the opening and against the film portion across the opening so that the film portion across the opening will evenly deflect the air into all the inlet passageways to simultaneously inflate all of the chambers.

Preferably, the device includes an air directing nozzle with an open terminal end which, during inflation of the cushion, is centrally pressed against the film portion across the opening to help smooth and tension the inlet passageways around the nozzle in a proper orientation for filling. The nozzle may have apertures or notches formed in its terminal end to aid in promoting the even radially outward flow of air from the nozzle along the film portion across the opening.

Additionally, the novel device for inflating and sealing the cushions includes means for sequentially positioning inflatable cushions at an inflation station on the device, means for positioning the nozzle in the opening of a cushion positioned at the exposure station, and means for clamping the cushion at the exposure station at its edges with sufficient tension to insure smoothing of the cushion around the nozzle while affording frictional slippage of the cushion edges as is required to allow shortening of the cushion's peripheral dimension during inflation thereof.

BRIEF DESCRIPTION OF THE DRAWING

The present invention will be further described with reference to the accompanying drawing wherein like numbers refer to like parts in the several views, and wherein:

FIG. 5 is an end view, partially in section, of the device of FIG. 4;

FIG. 6 is a top view, partially in section, of the device of FIG. 4;

DESCRIPTION OF THE PREFERRED EMBODIMENT

Figure 1:
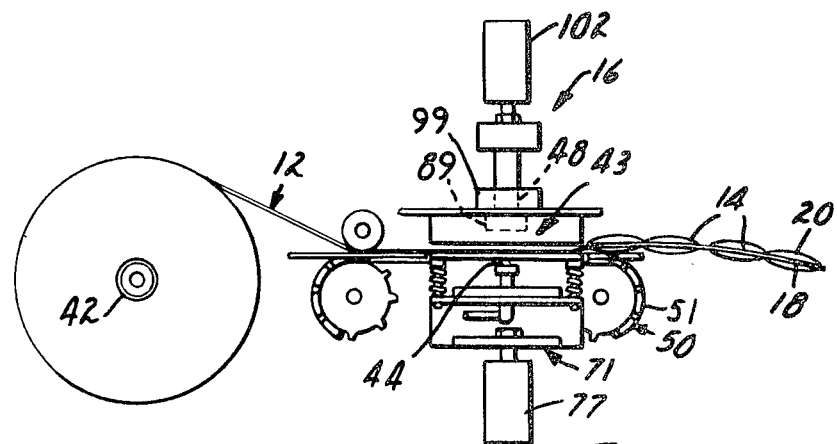
FIG. 1 is a schematic illustration of a system according to the present invention for providing on site completion of air cushions.

Referring now to the drawing, there is schematically illustrated in FIG. 1 a system according to the present invention for providing convenient completion of air filled cushions, such as are used in packaging, at the site of their intended use. The system comprises a strip material 12 which provides a concatenation of inflatable cushions 14 of the type illustrated in FIG. 2, and a device 16 which sequentially inflates and seals the cushions 14, after which the inflated cushions 14 may be separated from the strip material 12 and used as desired.

Figure 2:
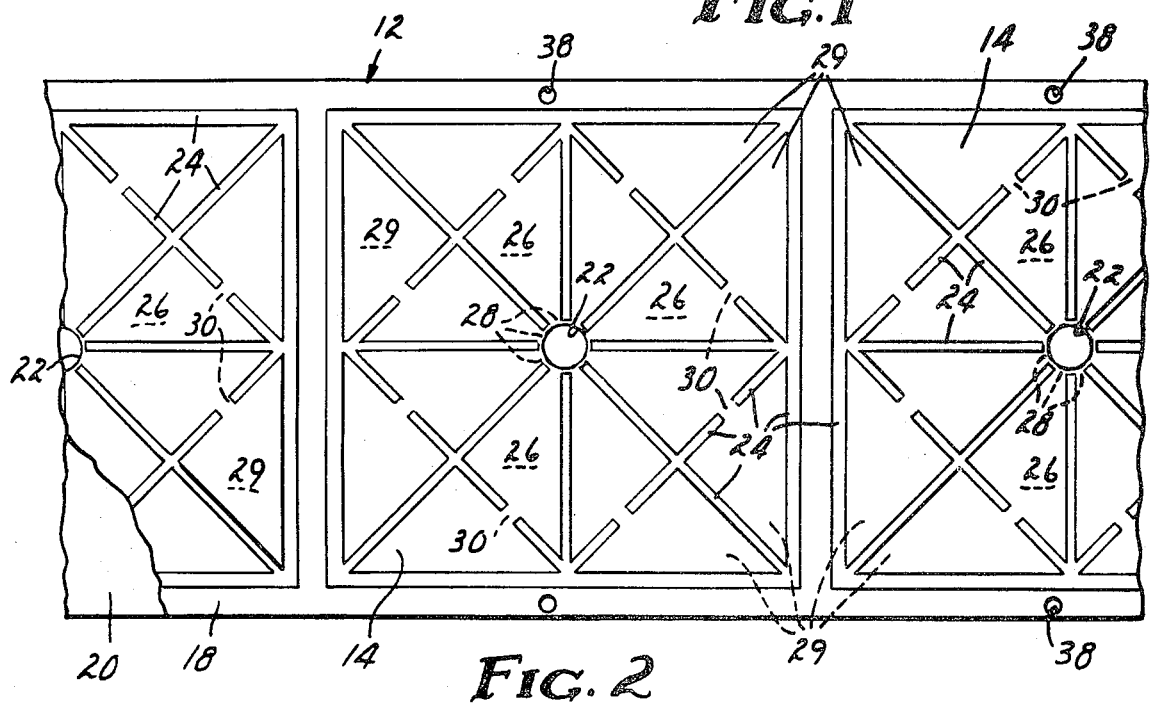
FIG. 2 is a fragmentary plan view of a first embodiment of a strip material used in the system of FIG. 1.
Figure 4:
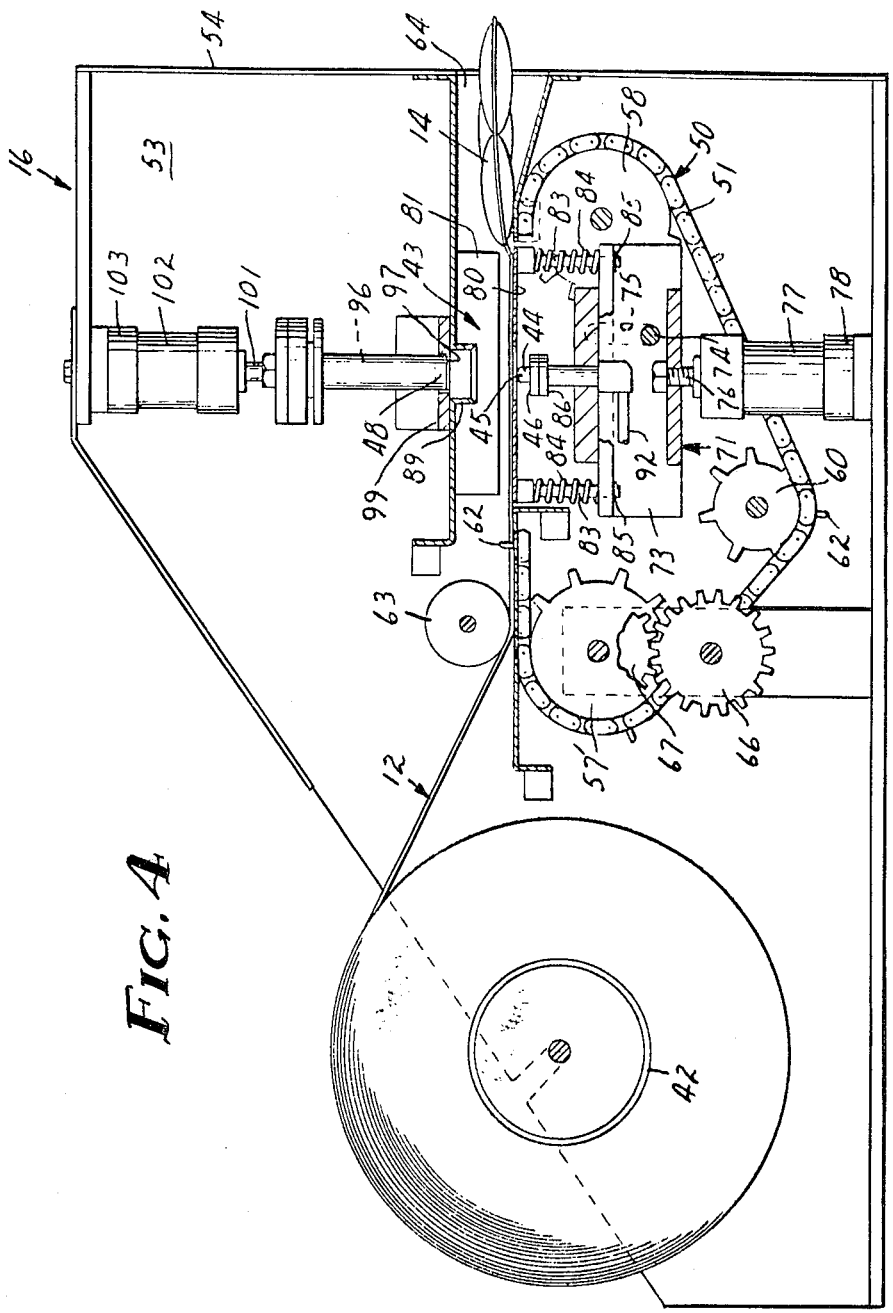
FIG. 4 is an elevational side view, partially in section, of a device included in the system of FIG. 1 for inflating the strip material of FIG. 2.

The strip material 12, as is best illustrated in FIG. 2, comprises first and second thin flexible films 18 and 20 each comprising a heat sealable polymeric thermoplastic material forming at least one surface, and positioned with their thermoplastic surfaces in face-to-face contact.

The first film 18 has a plurality of openings 22 which are spaced longitudinally of the strip material 12, and are generally centered across the width of the strip material 12. The films 18 and 20 are fused together under pressure and heat in discrete generally linear areas 24 to define, for each of the openings 22, a plurality of generally triangular inflatable chambers 26 between the layers 18 and 20. The chambers 26 are disposed around the opening 22 and each have a portion providing an inlet passageway 28 to the chamber 26 from the opening 22. Additional secondary triangular chambers 29 are formed around the chambers 26 to complete a desired pattern for the cushion 14. The chambers 29 each communicate with the opening 22 through one of the chambers 26 and a crossover passageway 30, which passageways 30 afford inflation of the chambers 29 and shock absorption for the inflated cushion via air transfer between the interconnected chambers 26 and 29.

The films 18 and 20 may consist of a polyolefin such as polyethylene or polypropylene, or a layered film (e.g. coated, laminated or co-extruded film) such as a polyester backed ethylene vinyl acetate copolymer, a polyvinylidene chloride coated polyethylene, a thermoplastic coated paper or a polyolefin coated polyester. The main requirement for the film is that a heat sealable material forming at least one of its surfaces will fuse to a mating surface to form an air tight seal when the films are subjected to the application of moderate pressure and heat, and that it has desired strength and gas barrier properties. A polyester film coated with an ethylene vinyl acetate copolymer has been found to produce air cushions having a very high bursting strength, which may be particularly desirable for some applications.

Figure 3:
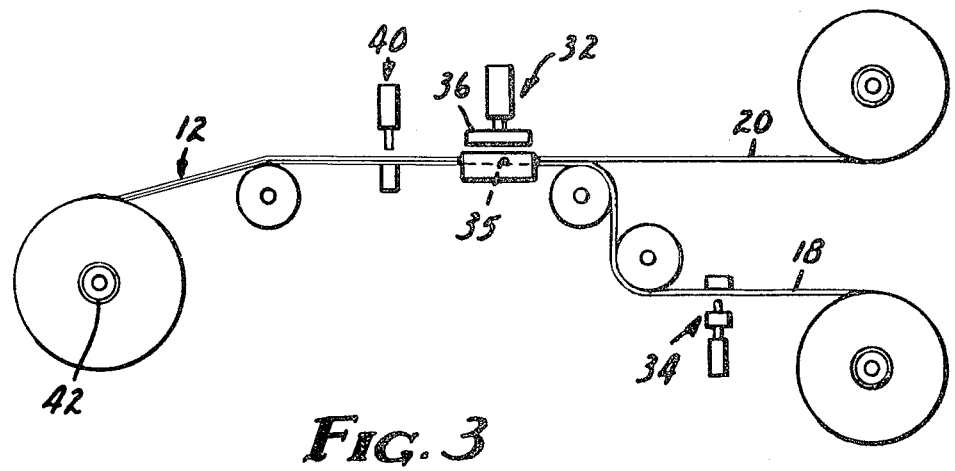
FIG. 3 is a schematic illustration of the preparation of the strip material of FIG. 2.

As is schematically illustrated in FIG. 3, the strip material 12 is conveniently prepared by feeding the first and second film 18 and 20 along separate paths to a forming station 32. The first film 18 is fed past a punch mechanism 34 which punches the openings 22 along its length. At the forming station 32 the films 18 and 20 are supported on a planar surface 35 in face-to-face contact with their edges aligned, and the face of an electrically heated die 36 having raised ridges in the configuration of the discrete areas 24 to be fused between the films 18 and 20 is pressed against the second film 20 to fuse the films 18 and 20 together. Alternatively the discrete areas 24 between the films 18 and 20 can be fused together by the known process of infra-red black line sealing using a copying machine such as the Model 47 "Thermofax" Copier sold by Minnesota Mining and Manufacturing Company, St. Paul, Minn.. Subsequent to fusing of the areas 24 a punch assembly 40 punches perforations 38 along the edges of the strip material 12 in a predetermined relationship with respect to the openings 22 to provide a means for indexing the strip material 12 in the device 16, and the strip material 12 is wound on a spool 42 for shipment to the site where the inflatable cushions 14 formed therein will be inflated and sealed.

The device 16 for inflating and sealing the cushions 14 is best seen in FIGS. 4 through 9. Generally the device 16 includes means for positioning the inflatable cushion 14 at an inflation station 43 defined on the device 16, means for positioning a nozzle 44 in the opening 22 of the cushion 14 with the surface of the cushion 14 smoothly supported around the nozzle 44 and over a support surface 46 spaced a short distance from a terminal end 45 of the nozzle 44 (see FIG. 7), means for directing air through the nozzle 44 to inflate the supported cushion 14 (see FIG. 8), and means for sealing the inflated chambers 26 in the cushion 14, including the end of a heated, hollow, cylindrical tube 48 which is pressed toward the support surface 46 around the nozzle 44 to seal shut the inlet passageways 28 around the opening 22 (see FIG. 9).

The means for positioning the inflatable cushion 14 at the inflation station 43 includes a motor driven endless conveyor 50 comprising two endless chains 51. The chains 51 are movably supported on spaced walls 53 of a frame 54 for the device 16 by a first and a second pair of sprockets 57 and 58. Each pair of sprockets 57 and 58 is fixed to a common shaft rotatably mounted between the walls 53 to insure simultaneous movement of the chains 51. An adjustable idler sprocket 60 is also provided for tensioning each chain 51, so that the chains 51 will move along a generally linear path portion between the sprockets 57 and 58 and past the inflation station 43.

The chains 51 each carry a plurality of pins 62 spaced along the length of each chain 51 and positioned opposite each other between the chains 51. The pins 62 are adapted to enter the perforations 38 along the edges of the strip material 12, and thus make driving contact with the strip material 12 to drive it from the spool 42 which is rotatably supported on the frame 54, under a roller 63 which guides the strip material 12 onto the pins 62, along the linear path portion of the conveyor past the inflation station 43, and subsequently (after inflation) out of an outlet opening 64 in the frame 54.

A synchronous motor 65 supported on the frame 54 drives the conveyor 50 through a sprocket 66 coupled to the motor 65, and a sprocket 67 coupled to the shaft on which are mounted the first pair of sprockets 57. Operation of the motor 65 is controlled by a cam 68 and switch 69 assembly in which the cam 68 is fixed to the shaft for the first pair of sprockets 57, and the switch is fixed on the frames 54. The cam 68 has two equally spaced lobes, so that each half revolution of the first pair of sprockets 57 (which are sized so that one half revolution thereof will advance the conveyor a distance equal to the length of one inflatable cushion to change the inflatable cushion 14 at the inflation station 43) will activate the switch 69 and via a control circuit for the device 16, will deactivate the conveyor 50 until the device is again activated to inflate another cushion 14. The cam 68 is properly indexed with respect to the pins 62 and perforations 38 in the strip material 12 to position an opening 22 in the strip material 12 at the inflation station 43 over the nozzle 44 after each operation of the motor 65.

The means for positioning the nozzle 44 in the opening 22 of a cushion 14 at the inflation station 43 with the surface of the cushion 14 smoothly supported around the nozzle 44 includes a clamp and nozzle assembly 71. The clamp and nozzle assembly 71 can be moved into contact with the inflatable cushion 14 to first clamp its opposite edges in a fixed position, and then moves the terminal end 45 of the nozzle 44 into the opening 22 and the support surface 46 into engagement with the cushion 14 at the inlet passageways 28 adjacent the opening 22 to tension and smooth the uninflated cushion 14 around the nozzle 44.

The clamp and nozzle assembly 71 includes a nozzle table 73 which supports the nozzle 44 with its terminal end 45 projecting outwardly at right angles to the strip material along the conveyor 50 path portion between the sprockets 57 and 58. The nozzle table 73 is guided for movement relative to the frame 54 in a direction at a right angle to the path portion for the conveyor 50 between the sprockets 57 and 58 by a rod 74 which is slidable along slots 75 in both side walls 53. The nozzle table 73 is fixed to a piston 76 of an air cylinder 77 which has its housing 78 fixed to the frame 54. The nozzle table 73 is movable via the air cylinder 77 between positions defined by the ends of the slots 75, including a retracted position (FIGS. 4 and 5) with the nozzle 44 spaced from the strip material 12 on the conveyor 50, and an extended position with the terminal end 45 of the nozzle 44 projecting through the conveyor 50 in a position to engage the opening 22 in an inflatable cushion 14 at the inflation station 43 (FIGS. 7, 8, and 9).

The nozzle table 73 also supports a clamping plate 80 which during movement of the nozzle table 73 from its retracted to its extended position provides means for lifting the cushion 14 at the inflation station 43 from the pins 62 prior to its inflation; and for clamping two opposite edges of the inflatable cushion 14 at the inflation station 43 with sufficient force so that further movement of the nozzle table 73 will press the nozzle 44 into the opening 22 in the clamped cushion 14 and smooth and tension it about the nozzle 44, while affording limited frictional movement of the edges of the cushion as the dimensions of the cushion 14 shorten during its inflation.

The clamping plate 80 has four rods 83 projecting from its corners and mounted in axial sliding engagement through openings in the nozzle table 73. A coil spring 84 is positioned around each of the rods 83 between the nozzle table 73 and the clamping plate 80 to provide means for biasing the clamping plate 80 toward an outer position relative to the nozzle table 73, which position is defined by retaining collars 85 engaged with the ends of the rods 83. The clamping plate 80 has a central opening which will permit the nozzle 44 to project through the clamping plate 80. During movement of the nozzle table 73 toward its extended position, the clamping plate 80 will contact and press the cushion 14 on the conveyor 50 at the inflation station 43 against the clamping bars 81, securing the edges of the cushion 14 in place. Further movement of the nozzle table 73 toward its extended position will cause the nozzle table 73 to move along the rods 83 against the bias of the springs 84 (which exert increasing force to clamp the cushion 14 between the clamping plate 80 and the bars 81) and will cause the nozzle 44 to project through the clamping plate 80 where it will enter the opening 22 and subsequently raise the center of the cushion 14 to smooth and tension it around the nozzle 44.

Figure 7:
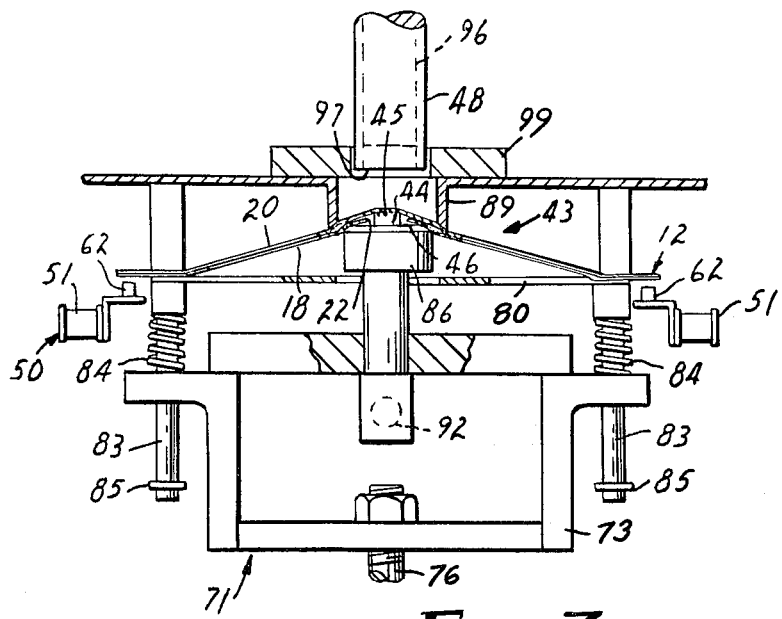
FIG. 7 is an enlarged fragmentary view, partially in section of an inflation station in the device of FIG. 4 illustrating a cushion positioned about an inflating nozzle therein.
Figure 8:
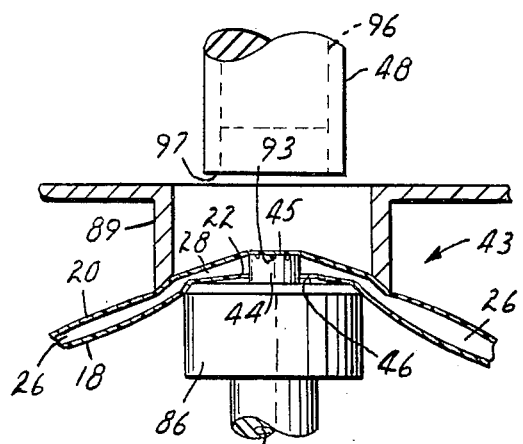
FIG. 8 is an enlarged fragmentary view, partially in section of the nozzle in FIG. 7 during the inflation of a cushion.
Figure 9:
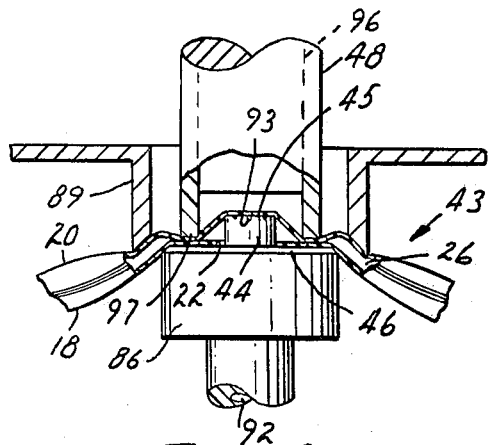
FIG. 9 is an enlarged fragmentary view, partially in section of the nozzle in FIGS. 7 and 8, but illustrated with a heated tube in position to seal an inflated cushion.

As is best seen in FIGS. 7, 8, and 9 the means for smoothing the cushion 14 about the nozzle 44 also includes a cylindrical support 86 (preferably of a resilient heat resistant material such as silicon rubber) spaced from the terminal end of the nozzle 44. The support 86 provides the annular support surface 46 which is coaxial with the nozzle 44, is spaced axially a short distance from the terminal end 45 of the nozzle 44, and has a diameter selected to provide a predetermined conical shape for the portion of the cushion 14 tensioned over the nozzle 44 and support 86. Additionally, as is best seen in FIG. 8, when the nozzle table 73 is in the extended position the nozzle 44 and support 86 enter a hollow cylindrical ring 89 fixed to the frame 54. The ring 89 has an inner diameter about one-sixteenth to one-eighth inch larger than the outer diameter of the support 86, and a smooth frusto-conical terminal end which will contact and further smooth the cushion 14 around the support 86.

The nozzle 44, which is mounted on the nozzle table 73, is hollow, and has a central axis aligned in the direction of movement of the nozzle table 73. The terminal end 45 of the nozzle 44 is open, and the nozzle 44 has an inlet opening 92 which is coupled to means for applying a regulated source of air under greater than atmospheric pressure. The nozzle 44 has a plurality of apertures 93 spaced around its periphery and formed in its terminal end 45 (see FIGS. 7 and 8). The apertures 93 are adapted to provide outward movement of air radially of the nozzle 44 when a cushion 14 is tensioned over the terminal end 45 thereof. As is best seen in FIG. 8, with the terminal end 45 of the nozzle positioned in the opening 22 of a cushion 14 tensioned over the nozzle 44, the air will exit through the apertures 93 along the portion of the second flexible layer 20 which extends across the opening 22, and enter the inlet passageways 28 to inflate the chambers 26. The ring 89 and support 86 for smoothing the cushion 14 insure that the inlet passageways 28 will be positioned to receive the air and insure even inflation of all the chambers 26 and 29.

It has been found that the cushion 14 can also be inflated by the nozzle 44 when its terminal end 45 is spaced a short distance from the portion of the film 20 that extends across the opening 22. The portion of the film 20 that extends across the opening 22 apparently deflects the stream of air from the open terminal end 45 evenly into all the adjacent inlet passageways 28 for the chambers 29. The spaced nozzle 44 does not provide the degree of smoothing for the cushion 14 around the opening 22 which is provided when the end 45 of the nozzle 44 is pressed against the film 20 over the opening 22, however thus does not fill as reliably or afford as reliable a heat seal by the heated tube 48.

The means for sealing the inlet passageways 28 to the chambers 26 after the cushion 14 is inflated comprises the hollow cylindrical heated tube 48 which is heated by an internal thermostatically controlled electric heater 96 (e.g. controlled at a temperature at or above the heat sealing temperature of the films 18 and 20), and has an annular end sealing surface 97 adapted to contact and seal the cushion 14 (see FIG. 9). The end of the heated tube 48 opposite the sealing surface 97 is slidably mounted in a central opening in a cylindrical guide 99 on the frame 54 to guide the heated tube 48 for axial movement, and is fixed to a piston rod 101 of a cylinder 102 which has its housing 103 attached to the frame 54. The cylinder 102 can be activated to move the heated tube 48 between a waiting position spaced from an inflatable cushion 14 tensioned over the nozzle 44 with the nozzle table 73 in its extended position (see FIG. 8); and a sealing position at which the sealing end surface 97 of the heated tube 48 will be pressed against such a cushion 14 on the support surface 46 to seal shut the inlet passageways 28 of the cushion 14 in a narrow band around its central opening 22 (see FIG. 9).

A control system (not shown) will cycle the device 16 to sequentially inflate and seal cushions 14 along the strip material 12. Assuming a cushion 14 to be inflated is positioned on the conveyor 50 at the inflation station 43, the control system first activates the air cylinder 77, to move the nozzle table 73 from its retracted position (FIGS. 4 and 5) toward its extended position. This causes the clamping plate 80 to clamp the ends of the cushion 14 against the clamping bars 81, after which movement of the clamping plate 80 stops while the nozzle table 73 moves relative thereto to position the terminal end 45 of the nozzle 44 in the opening 22 in the cushion 14, and tensions the cushion 14 around the nozzle 44 with the support 86 within the ring 89 to smooth the cushion around the nozzle 44 (see FIG. 7). The control system then maintains the nozzle table 73 in its extended position, while a source of air under greater than atmospheric pressure is connected to the inlet opening 92 of the nozzle so that air passes through the nozzle 44, radially out the apertures 93, enters the inlet passageways 28 and inflates the chambers 26 and 29 in the cushion 14 (see FIG. 8). Preferably the inflation is done in two states, with air under a higher pressure initially applied (e.g. 60 psi) to insure inflation of all the chambers 26 and 29 after which air under a lesser pressure (e.g. 15 psi) is applied to regulate the amount of pressure subsequently seealed in the chambers 26 and 29. This lesser pressure can be varied as desired to vary the resiliency of the inflated cushion 14.

After inflation, and while the air pressure is still being applied, the control circuit activates the cylinder 102 to move the tube 48 to its sealing position for a short predetermined time to press the sealing surface 97 of the heated tube 48 against the inlet passageways 28 over the support 86 thereby sealing shut the passages 28 (see FIG. 9). The continued application of air during the sealing process provides a desirable cooling effect for the sealed area of the cushion after the heated tube returns to its waiting position which restricts rupture of the seal area under the pressure of air in the chambers 26.

At the end of said predetermined time the control circuit returns the heated tube 48 to its waiting position and the nozzle table 73 to its retracted position, and activates the motor 65 to run the conveyor 50 which via engagement between the pins 62 and the next cushion 14 to be inflated pushes the inflated cushion 14 from the outlet opening 64 in the frame 54 and positions said next cushion 14 at the inflation station 43 (which position is determined when the cam 68 actuates the switch 69 to deactivate the motor). The cycle then repeats to inflate and seal the new cushion 14 at the inflation station 43.

We claim:

1. In a system for providing convenient on site completion of air cushions for use in packaging, said system comprising:

a plurality of inflatable cushions each having two thin flexible films, each film comprising a heat sealable thermoplastic forming at least one surface of the film, at least one of said films having an opening, and said films for each cushion being positioned with their thermoplastic surfaces in face-to-face contact and being fused together in discrete areas to define a plurality of inflatable chambers between the films disposed around the opening with each chamber having a separate inlet passageway communicating with the opening; and a device for inflating and sealing the inflatable cushions, said device comprising:

means adapted for directing air simultaneously into said inflatable chambers around the opening of one of said cushions comprising:

a nozzle having a terminal end adapted to be positioned in the opening of any one of said cushions and having at least one aperture adapted to direct air into the inlet openings for the chambers of the cushion when said terminal end is positioned in the opening;

means for smoothly positioning any one of said inflatable cushions around said nozzle with said nozzle in the opening of the cushion;

means for applying a source of air under greater than atmospheric pressure through said nozzle to inflate one of said cushions positioned around said nozzle; and means adapted for applying heat and pressure to seal shut the inlet passageways of said chambers around said opening subsequent to the inflation of the cushion;

the improvement wherein:

said opening in each of said cushions is formed in only one of the films of the cushion, with the other of said films being continuous across said opening; and said means for positioning any one of said inflatable cushions around said nozzle includes means for clamping the cushion at its edges; and means for positioning said nozzle in the opening of the cushion with the terminal end of said nozzle pressed against the film extending across the opening, said means for clamping the cushion being adapted to engage the cushion with a force which affords pressing the terminal end of said nozzle against the film extending across its opening to tension the cushion around the nozzle so that air from said air source means will be deflected by said film extending across the opening into said inlet passageways to simultaneously inflate all the chambers in the cushions, while affording frictional slippage of the edges of the cushion as the edge to edge dimensions of the cushion decrease during the inflation thereof.

2. A system according to claim 1, wherein said nozzle has an open terminal end adapted to be pressed against the film extending across said opening, and has a plurality of apertures formed in and spaced around said terminal end to insure radial distribution of said air from said terminal end, along said film extending across said openings and into said inlet passageways.

3. A system according to claim 1, wherein said cushions are concatenated into a strip material, and said device further includes conveyor means for sequentially positioning the cushions adjacent said nozzle and for sequentially operating said positioning means, air source means, and sealing means to inflate and seal said cushions.

4. A system according to claim 1, wherein said means for smoothly positioning any one of said inflatable cushions around said nozzle further comprises a support having an annular support surface, said support surface being coaxial around said nozzle, being adjacent and spaced a short distance from the terminal end of said nozzle, and having a diameter adapted to provide a predetermined conical shape for the portion of the cushion between the nozzle and the support and to smoothly support the inlet passageways of the cushion around said nozzle when the cushion is tensioned around said nozzle.

5. A system according to claim 4, wherein said means for smoothly positioning any one of said inflatable cushions around said nozzle further comprises a cylindrical member having a bore of a diameter larger in dimension than the diameter of said support member by a predetermined amount adapted to allow a circular portion of the cushion to be positioned therebetween, and having a terminal end adapted to contact the cushion, said cylindrical member being positioned coaxially around said support member with said terminal end contacting the surface of said cushion opposite that contacted by said support surface and with the portion of the cushion extending from the support surface being positioned between said support member and said cylindrical member when said means for positioning said nozzle presses the nozzle against the film extending across the opening of the cushion.

6. A device adapted for inflating and sealing an inflatable cushion comprising two thin flexible films, each film comprising a heat sealable thermoplastic forming at least one surface of the film, one of said films having an opening, and said films being positioned with their thermoplastic surfaces in face-to-face contact and being fused together in discrete areas to define a plurality of inflatable chambers between the films disposed around and each having a separate inlet passageway communicating with the opening, said device comprising:
- a hollow nozzle having an axis, a terminal end adapted to project axially into the opening of a said cushion and contact the portion of said film extending across said opening, and at least one aperture adapted to direct air into the inlet openings for the chambers when the terminal end is thus positioned in said opening;
- means adapted for smoothly positioning a said inflatable cushion around said nozzle comprising means adapted for tensioning the cushion over said nozzle with the terminal end of the nozzle in the opening in the cushion; and a support having an annular support surface said support surface being coaxial around said nozzle, being adjacent and spaced a short distance from the terminal end of said nozzle, and having a diameter adapted to provide a predetermined conical shape for the portion of the cushion tensioned between the nozzle and the support and to smoothly support the inlet passageways of the cushion around said nozzle;
- means for applying a source of air under greater than atmospheric pressure through said nozzle to direct said air simultaneously into all of said inlet passageways to inflate the chambers of the cushion; and
- means adapted for applying heat and pressure to seal shut the inlet passageways of said chambers around said opening against said support surface subsequent to inflation of said cushion.

7. A device according to claim 6, wherein said nozzle has an open terminal end adapted to be pressed against the film extending across said opening, and has a plurality of apertures formed in and spaced around said terminal end to insure radial distribution of said air from said terminal end, along said film extending across said openings and into said inlet passageways.

8. A device according to claim 6, wherein said means adapted for tensioning the cushion over said nozzle includes means for clamping the cushion at its edges around said nozzle for a force which affords pressing the terminal end of said nozzle against said film extending across said opening, and which affords frictional slippage of the edges of said cushion as the edge to edge dimensions of said cushion decrease during the inflation thereof.

9. A device according to claim 6, adapted for use with cushions concatenated into a strip material, wherein said device further includes conveyor means for sequentially positioning the cushions adjacent said nozzle and for sequentially operating said positioning means and air source means and heat and pressure source means to inflate and seal said cushions.

10. A device according to claim 6, wherein said means for smoothly positioning a said inflatable cushion around said nozzle further comprises a cylindrical member having a bore of a diameter larger in dimension than the diameter of said support member by a predetermined amount adapted to allow a circular portion of the cushion to be positioned therebetween, and having a terminal end adapted to contact the cushion, said cylindrical member being positioned coaxially around said support member with said terminal end contacting the surface of said cushion opposite that contacted by said support surface and with the portion of the cushion extending from the support surface being positioned between said support member and said cylindrical member when said means for tensioning the cushion over said nozzle presses the nozzle against the film extending across the opening of the cushion.

11. A method for inflating and sealing an inflatable cushion comprising the steps of:
- providing a cushion having two thin flexible films, each film comprising a heat sealable thermoplastic forming at least one surface of the film, one of said films having an opening, and said films being positioned with their thermoplastic surfaces in face-to-face contact and being fused together in discrete areas to define a plurality of inflatable chambers between the films disposed around and each having a separate inlet passageway communicating with the opening;
- positioning a nozzle having a terminal end into the opening of the cushion with the terminal end of the nozzle contacting the portion of the film extending across the opening;
- tensioning the cushion around the nozzle to provide a predetermined conical shape for a portion of the cushion around said nozzle;
- smoothing the predetermined conical shaped portion of the cushion around said nozzle;
- applying a source of air under greater than atmospheric pressure through said nozzle so that the air will be evenly deflected by the film across said opening simultaneously into all of the inlet passageways to inflate the chambers of the cushion;
- allowing the edges of said tensioned cushion to move toward said nozzle while maintaining said tensioning of the cushion as the edge to edge dimensions of the cushion decrease during the inflation thereof; and
- applying heat and pressure to seal shut the inlet passageways of the chambers around the opening subsequent to inflation of the cushion.

* * * * *